United States Patent
William (10) Patent No.: US 9,195,689 B2
(45) Date of Patent: Nov. 24, 2015

(54) CONVERTING STRUCTURED DATA INTO DATABASE ENTRIES

(71) Applicant: Business Objects Software Ltd., Dublin (IE)

(72) Inventor: John Alex William, Walldorf (DE)

(73) Assignee: BUSINESS OBJECTS SOFTWARE, LTD., Dublin (IE)

( * ) Notice: Subject to any disclaimer, the term of this patent is extended or adjusted under 35 U.S.C. 154(b) by 208 days.

(21) Appl. No.: 13/770,946

(22) Filed: Feb. 19, 2013

(65) Prior Publication Data

US 2014/0236972 A1 Aug. 21, 2014

(51) Int. Cl.
*G06F 17/30* (2006.01)

(52) U.S. Cl.
CPC ................ *G06F 17/30292* (2013.01)

(58) Field of Classification Search
USPC .......................................................... 707/809
See application file for complete search history.

(56) References Cited

U.S. PATENT DOCUMENTS

| 7,013,306 | B1* | 3/2006 | Turba et al. | 707/999.101 |
| 7,158,967 | B1* | 1/2007 | Turba et al. | 707/999.004 |
| 2008/0189302 | A1* | 8/2008 | Evani | 707/100 |
| 2013/0031112 | A1* | 1/2013 | Gunn et al. | 707/755 |

OTHER PUBLICATIONS

Relational database, printed from Wikipedia the free encyclopedia (en.wikipedia.org/wiki/Relational_database), on Feb. 18, 2013, 6 pages.

XML (Extensible Markup Language), printed from Wikipedia the free encyclopedia (en.wikipedia.org/wiki/Xml), on Feb. 18, 2013, 15 pages.

* cited by examiner

*Primary Examiner* — Khanh Pham
(74) *Attorney, Agent, or Firm* — Dilworth IP LLC (57) ABSTRACT

Systems and methods for converting structured data into database entries include receiving data values and metadata elements that form a data structure for the data values. The data values are converted into entries in database tables that are related according to the data structure formed by the metadata elements. The database table entries may be used to generate a webpage configured to report a metric of the data values.

7 Claims, 5 Drawing Sheets

CONVERTING STRUCTURED DATA INTO DATABASE ENTRIES

BACKGROUND

Many companies today rely on business intelligence systems to store and analyze data regarding their business processes. Such a business intelligence system may receive data regarding the business from any number of sources. For example, a business intelligence system may receive data regarding the company's employees from a payroll or human resources (HR) application. In another example, a business intelligence system may receive data regarding products manufactured and sold by the company from an enterprise resource planning (ERP) application. In a further example, a business intelligence system may receive data regarding a competitor's products, such as pricing information.

In addition to receiving and storing data regarding a company's operations, a business intelligence system may also include various utilities that use the data for purposes of driving business decisions, benchmarking, planning, and other functions. To this end, report generation and data analytics play important roles in allowing decision makers to quickly review and assess the various aspects of the business. For example, a sales report may allow a sales manager to determine which products are selling well, which members of the sales team are performing poorly, or how sales revenues compare to other time periods. However, entry of the sales-related information driving the report may require a sales team member to log into the underlying system to enter the data. Similarly, the layout of the sales report may be created in a static manner by a programmer to link the report to its underlying data (e.g., the sales manager has no control over how the report is presented). It is challenging and difficult to devise mechanisms that allow for the dynamic entry of data to a business intelligence system and the dynamic analysis of the dynamically entered data.

SUMMARY

Implementations of the systems and methods for converting structured data into database entries are described herein. One implementation is a computerized method of converting structured data into entries in a database. The method includes providing a webpage configured to receive data values and a metadata structure for the data values as input. The webpage is configured to convert the entered data values and metadata structure into Extensible Markup Language (XML) format. The method also includes receiving the data values in XML format and converting the data values in XML format into entries in database tables of a database. The database tables are related according to the metadata structure for the data values. The method further includes retrieving the data values from the database tables using the metadata structure. The method additionally includes providing a webpage configured to report a metric of the data values.

Another implementation is a computerized method of converting structured data into entries in a database. The structured data includes metadata elements, one or more attributes associated with an element, and data values for the one or more attributes. The metadata elements in the structured data are also related according to a hierarchy. The method includes receiving the structured data at a processing circuit and parsing the structured data to identify the metadata elements in the structured data. The method further includes for each identified metadata element, creating a table entry in a metadata table. The metadata table is configured to relate table entries in the metadata table according to the hierarchy of the structured data. The method also includes for each identified metadata element, creating an element table in the database referencing the metadata table. The element table includes any attributes and data values associated with the identified metadata element. The method additionally includes using the metadata table and element tables to generate a webpage configured to report a metric of the data values in the element tables.

A further implementation is a system for converting structured data into entries in a database. The system includes a processing circuit configured to receive the structured data. The structured data includes metadata elements, one or more attributes associated with an element, and data values for the one or more attributes, with the metadata elements in the structured data being related according to a hierarchy. The processing circuit is configured to parse the structured data to identify the metadata elements in the structured data. The processing circuit is also configured to create, for each identified metadata element, a table entry in a metadata table, the metadata table being configured to relate table entries in the metadata table according to the hierarchy of the structured data. The processing circuit is further configured to create, for each identified metadata element, an element table in the database referencing the metadata table, the element table comprising any attributes and data values associated with the identified metadata element. The processing circuit is also configured to use the metadata table and element tables to generate a webpage configured to report a metric of the data values in the element tables.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, a business intelligence system may be configured to convert structured data into database entries for use by the system's reporting and analytics utilities. In general, structured data refers to any set of data values that includes metadata regarding the relationships between the data values. For example, data values may be hierarchically related and the hierarchy defined using metadata (e.g., "San Francisco" is a child element of "California" according to the metadata hierarchy State>City). In some embodiments, the structured data may be formatted for use by a web browser. Exemplary formats may include, but are not limited to, the Extensible Markup Language (XML) format, the JavaScript Object Notation (JSON) format, and any other format configured to allow the communication of structured data over a network. Web services of the business intelligence system may also be configured use structured data to allow users to interact with the database entries, in various embodiments. Thus, a remote user of the business intelligence system's reporting and data analysis web services may be able to create, analyze, and view the data stored in the database.

Figure 1:
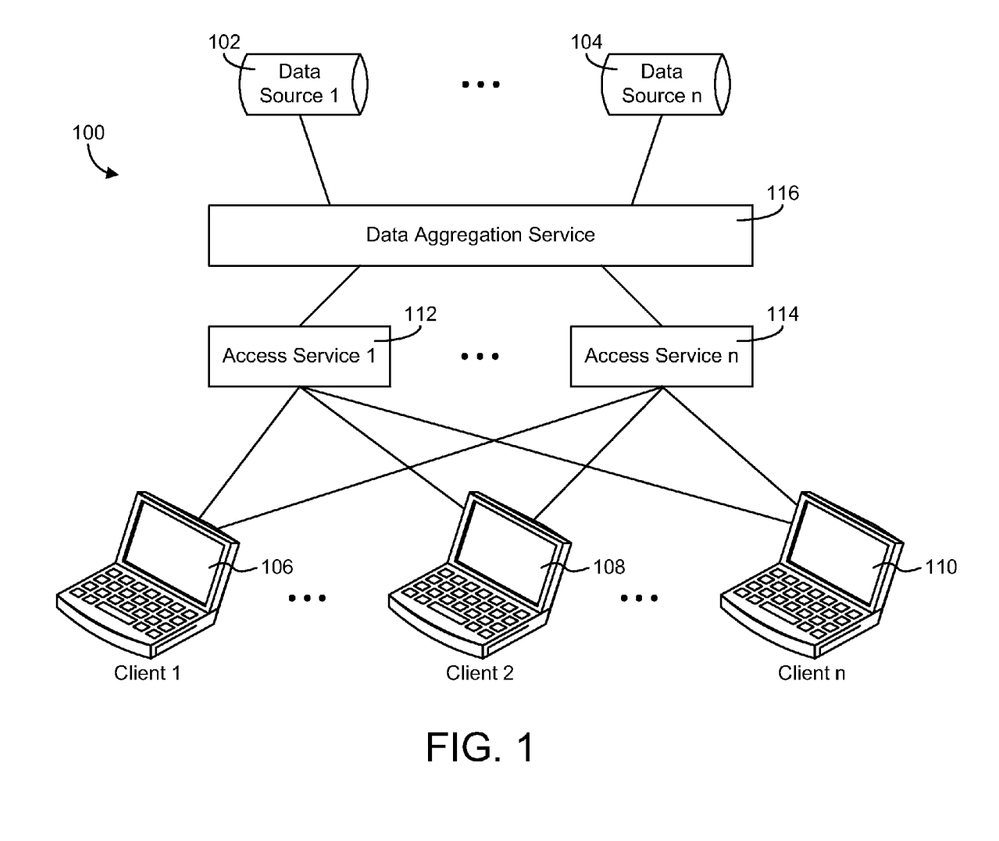
FIG. 1 is a block diagram of a computer system, in accordance with an exemplary embodiment.

Referring to FIG. 1, a block diagram of a computer system 100 is shown, in accordance with an exemplary embodiment. System 100 includes one or more client devices 106-110 (e.g., a first device, a second device, etc., through an nth device) configured to access business data available from one or more data sources 102-104 (e.g., a first through nth data source). As shown, system 100 may also include one or more access services 112-114 (e.g., a first through nth service) configured to allow clients 106-110 to access data sources 102-104 or perform other functions, such as analyzing data from data sources 102-104, providing reporting utilities, providing collaboration utilities, and other business intelligence-related functions. Computer system 100 may also include a data aggregation service 116 that aggregates data from data sources 102-104 and passes data between access services 112-114 and data sources 102-104.

Client devices 106-110 are computing devices that may allow users to add, modify, analyze, or delete data stored in data sources 102-104. Exemplary computing devices include, but are not limited, desktop computers, laptop computers, tablet computers, mobile devices, and smart televisions. Client devices 106-110 may each include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housings of client devices 106-110 (e.g., a built-in display, microphone, etc.) or external to the housing of client devices 106-110 (e.g., a monitor connected to client device 106, a speaker connected to client device 108, etc.), according to various implementations. For example, client device 106 may include an electronic display, which displays webpages and other data received from access services 112-114.

Access services 112-114 may be software applications stored and executed by one or more servers in communication with client devices 106-110. For example, access service 112 may be executed by a first server and access service 114 may be executed by a second server. In another example, access services 114-116 may be executed by the same server. According to various embodiments, client devices 106-110 may execute local applications to make use of access services 112-114. For example, access service 112 may provide a webpage-based interface to a web browser on client device 108, to allow the user of client 108 to interact with access service 112. In another example, client device 106 may execute a stand-alone application to interact with access service 114 (e.g., an application specifically configured to utilize access service 114). For example, the stand-alone application may include the logic for the visual layout of interface screens displayed by client device 106 and access service 114 may provide data values to the stand-alone application for presentation on the screens. In a further example, client 110 may execute a thin client application that receives data from access service 112.

Access services 112-114 may communicate with client devices 106-110 via a data communications network. The network may include the Internet and/or other types of data networks, such as a local area network (LAN), a wide area network (WAN), a cellular network, satellite network, or other types of data communications networks. The network may also include any number of intermediary computing devices (e.g., computers, servers, routers, network switches, etc.) that are configured to receive and/or transmit data. The network may further include any number of hardwired and/or wireless connections. For example, client device 106 may interface with the network via a wireless connection (e.g., via WiFi, cellular, radio, etc.) or via a hardwired connection (e.g., via a fiber optic cable, a CAT5 cable, etc.). In various embodiments, client devices 106-110 and access services 112-114 may be located within the same area (e.g., the same building or campus) or may be separated geographically (e.g., access services 112-114 and client devices 106-110 may be located in different locations throughout the world).

Client devices 106-110 may each include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housings of client devices 106-110 (e.g., a built-in display, microphone, etc.) or external to the housing of client devices 106-110 (e.g., a monitor connected to client device 106, a speaker connected to client device 108, etc.), according to various implementations. For example, client device 106 may include an electronic display, which displays webpages and other data received from access services 112-114.

Data sources 102-104 may include any number of files, applications, or databases in which business data may be stored. Exemplary data sources include, but are not limited to, spreadsheets, XML files, databases, database cubes, and business applications (e.g., an ERP application, a customer relationship management application, etc.). In various embodiments, data sources 102-104 are relational databases configured to store business data in relational tables. Data sources 102-104 may be stored on the same computing devices that execute access services 112-114 or on other networked devices, in various embodiments. For example, servers in a data center may store data sources 102-104 and execute access services 112-114. In another example, access service 114 may provide a search query to a remote data source 102 via the Internet.

Computer system 100 also includes a data aggregation service 116 that acts as an intermediary between access services 112-114 and data sources 102-104. In some embodiments, data aggregation service 116 is configured to generate database commands for data sources 102-104 in response to commands received via access services 112-114. For example, access service 112 may be a reporting service through which a sales report may be provided to client device 106. In response to the report being opened, data aggregation service 116 may generate one or more database commands to retrieve the corresponding report data from data sources 102-104. In one embodiment, database commands are issued by data aggregation service 116 using the using the Structured Query Language (SQL). In other words, data aggregation service 116 may provide a data context (e.g., a gateway to reach a particular data source) to an application context (e.g., the web pages, frames, visual components, etc.) provided by one of access services 112-114 to client 106.

According to various embodiments, data aggregation service 116 is configured to convert structured data received from client devices 106-110 via access services 112-114 into database entries in data sources 102-104. The structured data may include data values and metadata regarding relationships between the data values. For example, the metadata may define any number of hierarchies, trees, or other data structures that relate the various data points (e.g., a data value corresponding to a particular city may be hierarchically related to a data value corresponding to a particular state). Exemplary formats for the structured data include, but are not limited to, XML, JSON, or any other format that supports the communication of structured data. In response to receiving the structured data from client devices 106-108 via access services 112-114, data aggregation service 116 may analyze the structure of the received data, generate corresponding commands to reproduce the structure in data sources 102-104 (e.g., by issuing SQL or other database commands), and store the data values from the received data in data sources 102-104. For example, data aggregation service 116 may receive a set of hierarchically-related data from client 106 via access service 112 and create a set of hierarchically-related tables in data source 102 to store the data values in the received data. Data aggregation service 116 may also be configured to retrieve the data entered into data sources 102-104 in response to a request from one of access services 112-114. For example, access service 112 may be a reporting or analysis service via which the user of client device 108 is able to view or analyze the structured data stored in data source 102.

Access services 112-114 may be configured to allow users of client devices 106-110 to add or modify data stored in data sources 104-106 and to review and analyze the stored data (e.g., via a webpage report). For example, a first user of client device 106 may enter structured data into data source 104 via data aggregation service 116, a second user of client device 106 may create a report via access service 112 based on the stored data, and a third user of client device 106 may open the report via access service 112 to view its contents. Since data aggregation service 116 allows for the conversion between structured data (e.g., XML formatted data, JSON formatted data, etc.) and data stored in a database, users of client devices 106-110 may be able to enter data into data sources 102-104 through a web browser, in some embodiments. Thus, a user of the reporting and data analysis functions of access services 112-114 may also be able to modify the data underlying a report in data sources 102-104 via the same service.

Figure 2:
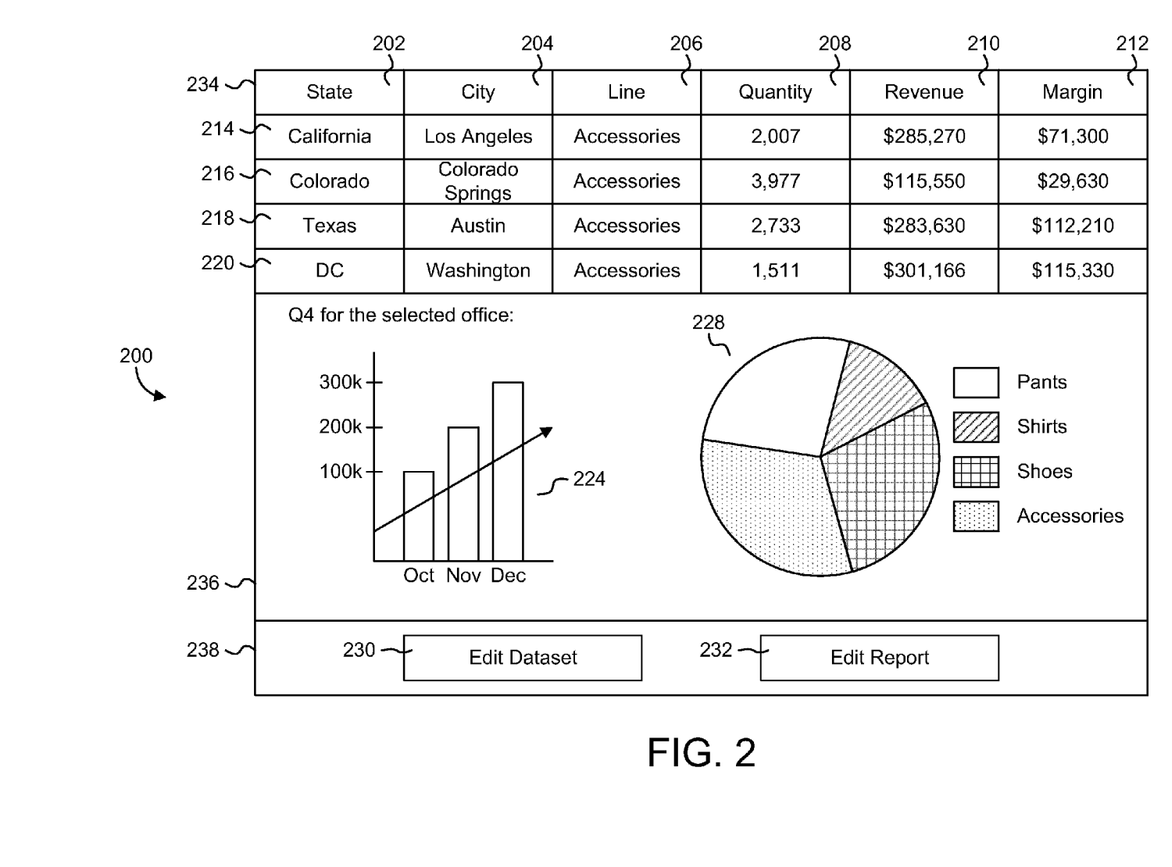
FIG. 2 is an illustration of a webpage displaying a sales report, according to an exemplary embodiment.

Referring now to FIG. 2, an illustration is shown of a webpage 200 containing a sales report, according to an exemplary embodiment. According to various embodiments, webpage 200 may be generated and provided to a client device by an access service of a business intelligence system. For example, webpage 200 may be generated by access service 112 shown in FIG. 1 and provided to client device 106 for display on an electronic display. Underlying webpage 200 may also be data stored within a database, such as the sales-related data used in the displayed sales report on webpage 200. The access service providing webpage 200 may provide data in XML, JSON, or another web-centric format for communicating structured data to the client device. In addition, the access service may also provide Hypertext Markup Language (HTML) formatted data, scripts (e.g., JavaScript or the like), or any other data used by a web browser of the client device to display webpage 200.

Webpage 200 may include any number of frames, allowing different menus, dashboard graphics, reports, webpages, and the like to be displayed to the user. For example, webpage 200 may include a first frame 234 (e.g., a report frame), a second frame 236 (e.g., a dashboard frame), and a third frame 238 (e.g., a menu frame). As used herein, the term "entity" is used herein to refer to the collection of a webpage, any frames of the webpage, any visual components of the webpage, and the content of the webpage. In one embodiment, an entity may be defined in the access service by an analytical application designer. Such a designer may, for example, associate data stored in a database with a graphical object (e.g., a meter, a chart, etc.) to be displayed on webpage 200. In some embodiments, the user of webpage 200 may be able to set parameters via the access service to control which content is presented via webpage 200. For example, the user may be able to set parameters such that webpage 200 displays various content in different frames, allowing the user to monitor different sets of business data in real time, near real time, or after periodic data updates. In further embodiments, access controls may be associated with webpage 200 and control the permissions of a user's account. For example, some users may be allowed to view sales-related data via webpage 200, but may be prevented from creating new sales-related data in the system.

In the example shown, webpage 200 includes various sales data for a company's sales offices. Sales figures may be broken down by any number of different dimensions. For example, the sales figures may be broken down by time period (e.g., day, week, month, fiscal quarter, year, etc.), geographic location (e.g., state, city, etc.), product line (e.g., clothing, accessories, shoes, etc.), or any other classification. The sales figures may also include various raw and calculated values, such as the quantity of items sold, the gross revenue of those sales, and the calculated profit margin for those sales. In one embodiment, the sales figures may be included on webpage 200 as a table in frame 234 that includes rows 214-220, which break down the sales data by sales office. Columns 202-204 include data regarding the states and cities in which the sales offices are located. For example, row 216 corresponds to sales data for the company's sales office located in Colorado Springs, Colo. Column 206 includes data regarding a particular product line. Columns 208-210 include sales data including the quantity of items sold, the revenue from those sales, and the profit margin of those sales, respectively. For example, the revenue generated by the Austin, Tex. sales office by selling accessories is $283,630. Any number of different time periods may also be associated with the sales data shown on webpage 200 (e.g., daily, weekly, quarterly, yearly, etc. sales figures).

In some embodiments, webpage 200 may be interactive, thereby allowing a user to navigate webpage 200 to view different reports or sales-related metrics. For example, positioning cursor 222 over row 214 or clicking on row 214 may cause webpage 200 to display charts or graphs in frame 236 regarding sales figures for the sales office in Los Angeles. As shown, a graph 224 and a chart 228 may be shown in frame 236, in response to selection of row 214 in frame 234. Graph 224 may be, for example, a bar graph showing the quarterly sales figures for the Los Angeles sales office broken down by month. Similarly, chart 228 may be a pie chart that the percentage of sales for the Los Angeles sales office broken down by product type (e.g., accessories, pants, shirts, shoes). In various embodiments, the sales data shown in frame 236 may differ by one or more dimensions (e.g., time frame, product type, etc.) from that shown in frame 234.

Frame 238 of webpage 200 may include any number of different selectable options to allow a user to edit a report (e.g., how the data is presented), edit the data set underlying a report, navigate between reports, set user preferences, or perform other functions. In one embodiment, permissions may be control access to the various functions available via frame 238. For example, a base user of the analytical application may be restricted to only viewing reports, a data creator may be allowed to enter data underlying a report, and a designer may be allowed to edit how the report is presented. In the example shown, assume that the current user of webpage 200 has permission to edit reports as well as the data underlying the reports. In such a case, frame 238 may include buttons 230, 232 configured to allow the user to edit the dataset underlying a report and edit the layout of a report, respectively.

In cases in which the data underlying a report is stored in a database, the system providing webpage 200 may include a software module configured to convert structured data in a webpage-format into database-formatted parameters, according to various embodiments. For example, webpage 200 may use a structured data format such as XML or JSON to allow a user to enter, remove, or otherwise edit the data underlying a report. The conversion module may then translate the data entered via webpage 200 into database parameters, thereby effecting the changes in the database. For example, structured data entered via webpage 200 may be converted into a set of relational database commands that create corresponding tables in the database (e.g., structured data entered via XML may be converted into corresponding SQL statements for use by the database). Thus, a user may be able to modify the data underlying a report directly within the reporting and analysis utility of webpage 200 without having to separately access the database or use another application to modify the data. In addition, the user entering the data via webpage 200 does not need to have knowledge of database commands to modify the underlying data, since the database commands are generated by the system's translation module.

Figure 3:
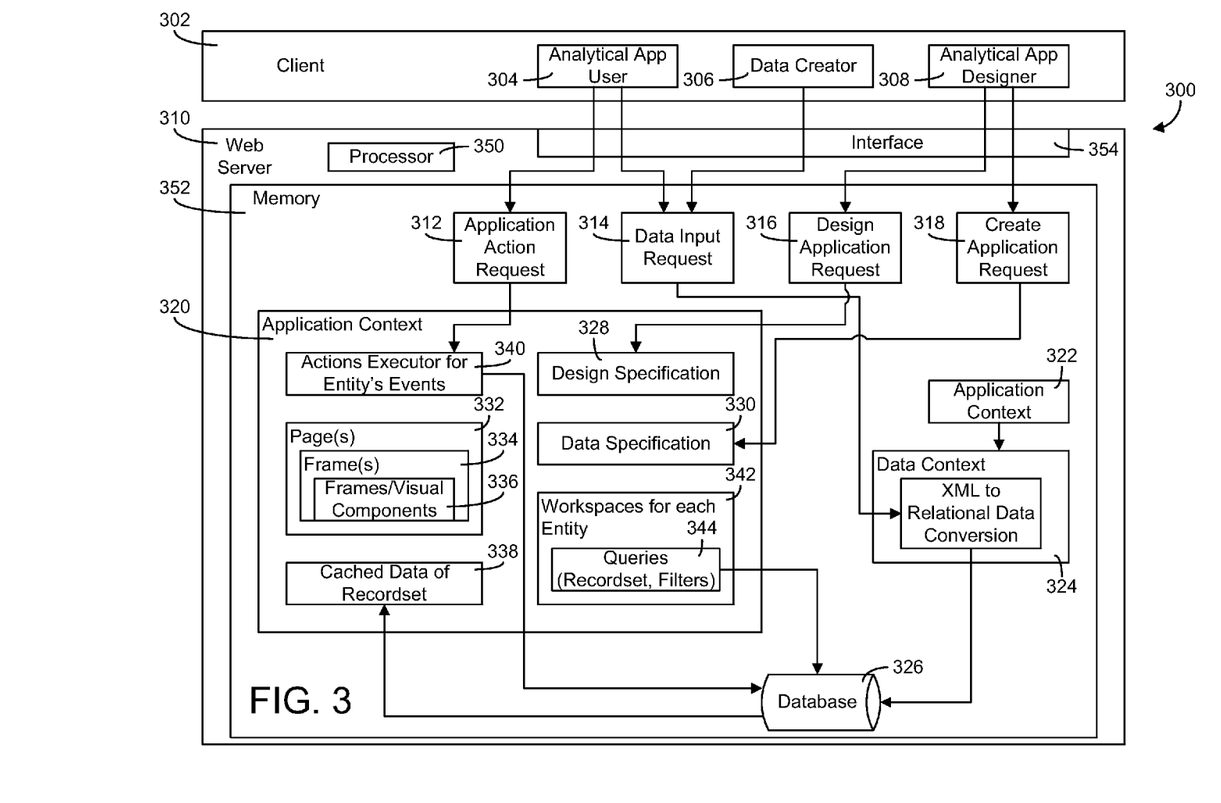
FIG. 3 is a schematic illustration of a computer system configured to translate structured data into database entries, according to an exemplary embodiment.

Referring now to FIG. 3, a schematic illustration of a computer system 300 configured to translate structured data into database entries is shown, according to an exemplary embodiment. As shown, computer system 300 may include a client device 302, a web server 310, and a database 326. Web server 310 is generally configured to act as a data reporting and analysis service for client 302. Web server 310 is also configured to act as a data aggregation service that provides an interface between its data reporting and analysis services and the corresponding data stored in database 326. In one embodiment, computer system 300 may be implemented using the infrastructure described in FIG. 1. For example, client device 302 may correspond to one of client devices 106-110, web server 310 may correspond to data aggregation service 116 and one or more of access services 114-116, and database 326 may correspond to one of data sources 102-104.

Web server 310 may be a computing device that includes a processor 350 and a memory 352, i.e., a processing circuit. Processor 350 may be, or may include, one or more microprocessors, application specific integrated circuits (ASICs), circuits containing one or more processing components, a group of distributed processing components, circuitry for supporting a microprocessor, or other hardware configured for processing. According to an exemplary embodiment, processor 350 is configured to execute computer code stored in memory 352 to complete and facilitate the activities described herein. Memory 352 can be any volatile or non-volatile computer-readable storage medium capable of storing data or computer code relating to the activities described herein. For example, memory 352 is shown to include modules 320-324 which are computer code modules (e.g., executable code, object code, source code, script code, machine code, etc.) configured for execution by processor 350. According to some embodiments, web server 310 may represent a collection of processing devices (e.g., servers, data centers, etc.). In such cases, processor 350 represents the collective processors of the devices and memory 352 represents the collective storage devices of the devices. When executed by processor 350, web server 310 is configured to complete the activities described herein.

Web server 310 also includes hardware circuitry for supporting the execution of the computer code stored in memory 352. For example, web server 310 is shown to include one or more hardware interfaces 354. Hardware interface 354 may include hardware to receive data from a network or serial BUS and to communicate data to another processing circuit via a network or serial BUS. Hardware interface 354 may be configured to receive or transmit data wirelessly (e.g., via radio signals, via infrared signals, etc.) or over a hardwired connection (e.g., a CAT5 cable, a fiber optic cable, etc.). For example, hardware interface 354 may receive requests 312-318 from client device 302 or communicate data to client device 302, such as a webpage.

As shown, any number of different users may operate client 302 to access the services provided by web server 310. For example, a first user 304 may be a base user of the data reporting and analysis service provided by web server 310, a second user 306 may be a data creator with account privileges to create or otherwise modify data stored in database 326, and a third user 308 may be a application designer with account privileges to control how the data in database 326 is reported and analyzed. The permissions of users 304-308 may be separate and distinct or may overlap for some users, in various embodiments. For example, user 308 may have the same set of account permissions as user 306, in addition to permissions regarding the creation and layout of reports (e.g., user 308 may also be allowed to modify data stored in database 326). One or more administrators may control which permissions are held by the user accounts of the data reporting and analysis service. Permissions may also be grouped according to user roles or assigned individually. For example, user 304 may be given permission to review and analyze sales data regarding the Austin, Tex. sales office, but may be restricted from accessing sales data from other offices.

According to various embodiments, user 306 may access database 326 via web server 310 to add, delete, or modify data stored in database 326. For example, user 306 may operate client device 302 to send a data input request 314 to web server 310. Data input request 314 may be sent once or multiple times to insert data into database 326 at regular intervals. Data input request 314 may be formatted using any web-based structured data formats, such as XML or JSON. For example, assume that user 306 wishes to input data regarding his company's sales offices and the sales figures for those offices. This inputted data may be hierarchically related, as defined by user 306. For example, one branch of the hierarchy may be Stores>Contacts>Region>Contact and another branch may be Stores>Revenues>Region>Summary. Such a hierarchy allows for different dimensions to be used by web server 310 when generating reports. Web server 310 may provide graphical utilities to client device 302 to facilitate the entry of the data by user 306. For example, user 306 may define data input request 314 via webpage based tables to enter sales data and graphical objects to define the structure of the entered data (e.g., by manipulating file structure graphical objects to define a hierarchy, by dragging and dropping table elements between one another, etc.).

Regardless of how the data is entered by user 306, it may be represented in data input request 314 as structured data. For example, one portion of data input request 314 may include the following XML code:

```
<stores>
    <contacts>
        <Region State = "California">
            <contact City="San Francisco"
            Store="e---Fashion San Francisco" manager="Daniel"/>
        </Region>
        <Region State="Colorado">
            <contact City="Colorado Springs" Store="e---Fashion
            Colorado Springs"
manager="Bennett"/>
        </Region>
        <Region State="DC">
            <contact City="Washington" Store="e---Fashion
            Washington Tollbooth"
manager="Barrett"/>
        </Region>
        <Region State="Texas">
            <contact City="Austin" Store="e---Fashion Austin"
            manager="Larry"/>
        </Region>
    </contacts>
        . . .
```

Such XML code includes data regarding the region (e.g., state), city, name, and manager of the different sales outlets of the company. For example, the store named "e-fashion San Francisco" is located in San Francisco, Calif. and is managed by "Daniel." The code also defines a hierarchy for the different types of data. For example, the code listed above also defines the hierarchy Stores>Contacts>Region>Contact. Assume also that a second branch of the hierarchy, Stores>Revenue>Region>Summary is defined in data input request 314 as follows under the "stores" tag shown above:

```
<Revenue>
    <Region City="Los Angeles" State="California">
        <summary Discount="$1,652" Lines="Accessories"
        Margin="$122,496"
QuantitySold="2,007" Year="2004" Salesrevenue="$285,270"/>
        <summary Discount="$3,758" Lines="City Skirts"
        Margin="$2,710" QuantitySold="27"
Year="2004" Salesrevenue="$5,271"/>
            . . .
    </Region>
        <Region City="San Francisco" State="California">
            <summary Discount="$472" Lines="Accessories"
            Margin="$89,341"
QuantitySold="1,370" Year="2004" Salesrevenue="$204,396"/>
            <summary Discount="$11,517" Lines="Dresses"
            Margin="$25,138"
QuantitySold="421" Year="2004" Salesrevenue="$54,915"/>
            . . .
        </Region>
        <Region City="Colorado Springs" State="Colorado">
            . . .
```

Thus, "Summary" entries in data input request 314 include data regarding the discount, product line, margin, quantity sold, year, and sales revenue, broken down according to the Stores>Revenue>Region>Summary hierarchy. For example, the San Francisco store sold 1,370 pieces of Accessories in the year 2004 giving a sales revenue of $204,396.

Data input request 314 is received by data context 324, a software module configured to convert the structured data in data input request 314 into database commands for use in database 326. In general, data context 324 acts as a gateway to reach a particular data source, such as database 326. In some embodiments, data context 324 may be referenced using a unique key value, allowing for different data contexts to be accessed by different client devices. The commands issued by data context 324 may be in SQL or another database language to add, delete, or modify data stored in database 326. Data context 324 may create a new database based on data input request 314 or modify an existing database (e.g., by adding, deleting, or changing values stored in an existing database). According to various embodiments, data context 324 retains the data relationships defined in data input request 314 when entering the data into database 326. For example, data context 324 may maintain the hierarchy of data defined in data input request 314 by creating table entries that denote a position in the hierarchy.

In one example of data context 324 maintaining the data structure of data input request 314, assume that data context 324 receives the XML data shown above. In such a case, data context 324 may create tables and table entries in database 326 to reproduce the hierarchies in data input request 314 (e.g., Stores>Contacts>Region>Contact, Stores>Revenue>Region>Summary, etc.). For example, data context 324 may issue the following SQL statement to create a metadata index table as follows:

CREATE TABLE "metadata_table"
(row_id char(2),
element_name char(25),
parent_id char(2));

which creates a table having three columns: row_id, element_name, and parent_id. In one embodiment, each table definition may be assigned a string data type. In other embodiments, a different data type may be defined in data input request 314. For example, data input request 314 may include XML Schema data that identifies a monetary value as having a decimal data type. Each layer of the hierarchy in data input request 314 may then be inserted into the metadata to create the following table:

TABLE 1

| row_id | element_name | parent_id |
|--------|--------------|-----------|
| 1 | stores | −1 |
| 2 | contacts | 1 |
| 3 | region | 2 |
| 4 | contact | 3 |
| 5 | revenue | 1 |
| 6 | region | 5 |
| 7 | summary | 6 | where parent_id references the row_id of the parent element in the hierarchy. For example, "contacts" and "revenue" data elements are both children of the "stores" data element (e.g., Stores>Contacts and Stores>Revenue). In some embodiments, the parent_id of the topmost element of the hierarchy may be assigned a special character or number that does not correspond to a row_id. For example, the topmost node of the hierarchy, "stores," has a parent_id of −1 which does not have a corresponding row_id in the metadata index table.

Data context 324 may also create tables to store the data from data input request 314 according to the metadata index Table 1 shown above. For example, data context 324 may create a first table stores_1 for the "stores" element as follows:

TABLE 2

| row_id | parent_id |
|---|---|
| 1 | −1 |

Data context 324 may also create a contacts_2 table to denote the hierarchy Store>Contacts as follows:

TABLE 3

| row_id | parent_id |
|---|---|
| 1 | 1 |

Similarly, data context 324 may create a region_3 table to denote the hierarchy Store>Region as follows:

TABLE 4

| row_id | State | parent_id |
|---|---|---|
| 1 | California | 1 |
| 2 | Colorado | 1 |
| 3 | DC | 1 |
| 4 | Texas | 1 |

Data context 324 may then enter values for the "Contact" elements in a contact_4 table to reproduce the Store>Contacts>Region>Contact as follows:

TABLE 5

| row_id | City | Store | Manager | parent_id |
|---|---|---|---|---|
| 1 | Los Angeles | e-Fashion Los Angeles | Steve | 1 |
| 2 | San Francisco | e-Fashion San Francisco | Daniel | 1 |
| 3 | Colorado Springs | e-Fashion Colorado Springs | Bennett | 2 |
| 4 | Washington | e-Fashion Washington | Barrett | 3 |
| 5 | Austin | e-Fashion Austin | Larry | 4 |

Each parent_id in the contact_4 table refers to a row_id in the region_3 table. Thus, the contact information for the Los Angeles and San Francisco stores are grouped under the California region. In a similar manner, data context 324 may construct the Stores>Revenue>Region>Summary branch of the hierarchy using the following revenue_5, region_6, and summary_7 tables as follows:

TABLE 6

| row_id | parent_id |
|---|---|
| 1 | 1 |

TABLE 6

| row_id | City | State | parent_id |
|---|---|---|---|
| 1 | Los Angeles | California | 1 |
| 2 | San Francisco | California | 1 |
| 3 | Colorado Springs | Colorado | 1 |
| 4 | Washington | DC | 1 |
| 5 | Austin | Texas | 1 |

TABLE 7

| row_id | Discount | Lines | Margin | Quantity | Year | SalesRevenue | parent_id |
|---|---|---|---|---|---|---|---|
| 1 | 1,652 | Accessories | 122,496 | 2,007 | 2004 | 285,270 | 1 |
| 2 | 3,758 | City Skirts | 2,710 | 27 | 2004 | 5,271 | 1 |
| ... | ... | ... | ... | ... | ... | ... | ... |

As a result, the tables and table entries created in database 326 by data context 324 now reflect both the data and the structure of data input request 314.

Once the data from data input request 314 has been stored in database 326 by data context 324, it may be used by any number of different application contexts 320-322 (e.g., a first through nth application context). In general, an application context contains all of the code that controls what data from database 326 is available to users, how the data is presented (e.g., which reports, charts, etc. are accessible by a user), how the data is analyzed, and how the data is accessed from database 326. An authorized user, such as user 308 may define an application context for use by other users, such as user 304. For example, user 308 may create a particular report or dashboard based on the data in database 326 for presentation to other users. User 308 may operate client device 302 or another client device to send a create application request 318 to web server 310. Create application request 318 may contain some or all of the information needed by web server 310 to create a new application context. Similarly, user 308 may modify application context 320 via a design application request 316. Design application request 316 may include any component design changes based on the available record set data in database 326, layout changes, application event changes, or the like.

As shown, application context 320 includes a data specification 330 from request 318 which specifies which data in database 326 is used by application context 320. For example, assume that user 308 wishes to create a webpage-based dashboard that allows user 304 to review sales revenues from the Los Angeles sales office. In such a case, create application request 318 may specify that application context 320 is to use some or all of the sales data entered into database 326 via data input request 314. Each of application contexts 320-322 may use the same data in database 326 or different data (e.g., from different data input requests), according to various embodiments.

Design application request 316 may include design specification 328, which defines how application context 320 presents and analyzes data from database 326. In one embodiment, design specification 328 may define the webpages 332, webpage frames 334, or visual components 336 presented within frames 334 that are part of application context 320. For example, design specification 328 may define that a first frame of a webpage is to show a pie chart breaking down the sales figures from the Colorado Springs sales office by product type. For purposes of brevity, a collection of webpages 332, frames 334, and visual components 336 are herein referred to as an "entity." Such entities may be provided to client device 302 based on the permissions of the user. For example, user 304 may be authorized to view a sales dashboard webpage provided to client device 302 via application context 320.

In some embodiments, application context 320 may also include workspaces 342, which are allocated portions of memory 352 through which queries 344 for database 326 may be stored. Queries 344 may be defined via design specification 328 in conjunction with an entity. For example, the entity showing a pie chart for the Colorado Springs sales office may have one or more corresponding database queries in queries 344. Each of queries 344 may also have corresponding record sets (e.g., the data from 326 retrieved from the query), as well as a set of filters used in the query. For example, various filters applied to sales data stored in database 326 may subdivide the data by sales office, year, product line, or the like. Condition details in design specification 328 may be treated as SQL condition statements (e.g., filters), in one embodiment. In some embodiments, query results may be categorized as either a dimension (e.g., a type of data stored in database 326) or a measure (e.g., a set of computed values derived from the data in database 326). For example, a dimension may be "year," thereby allowing the total sales data in database 326 to be queried along this dimension. In another example, a measure may be a summed value of different sales revenue table entries that results from a query. In some embodiments, each entity may also have a scope attribute through which filters from other entities may be inherited and applied (e.g., a user may be able to drill down through various reports or other analytical utilities of application context 320 to get increasing levels of detail about the sales data). For example, assume that a first entity has filters F1, F2 (e.g., year=2005 and city=Los Angeles) in its workspace and that a second entity references the first entity within its scope. In such a case, filters F1, F2 may also be used in the second entity's workspace.

In some embodiments, each of queries 344 is backed by a corresponding view in database 326 (e.g., a virtual table in database 326 that aggregates data from different tables according to the parameters of the query). For example, a view that aggregates sales figures for the year 2005 may provide the recordset of data to application context 320 for use by its corresponding entity or entities. In one embodiment, application context 320 may include a cache 338 of recordsets. Cache 338 generally operates to limit the number of queries and fetches performed by application context 320 on database 326. For example, cache 338 may retain all of the data values for a query used to convey data to a user via a webpage. Cache 338 may be refreshed by application context 320 periodically, whenever a new webpage is opened, in response to a refresh request, or at any other time.

Application context 320 may also include a software-based action executor 340 configured to execute an action specified in design specification 328 based on a received action request 312. Action request 312 may be, but is not limited to, a request to refresh query data, filter data using dynamic values, or navigating to another application state (e.g., navigating between different webpages). For example, user 304 may request that cached data 338 be refreshed via action request 312. In response, action executor 340 may re-run the corresponding queries in queries 344 to refresh the results in cache 338. The updated data in cache 338 may then be returned to client device 302 via an entity (e.g., one or more of webpages 332, frames 334, or visual components 336). In another example, user 304 may click on a displayed sales office to view additional sales metrics for that office, as shown in FIG. 2, thereby causing client device 302 to send action request 312 to web server 310. In response, action executor 340 may cause the corresponding webpages 332, frames 334, or visual components 336 for the selected sales office to be returned to client device 302 for display. In some embodiments, user 304 may also request certain analytical functions to be performed by application context 320 via action executor 340, such as numerical computations on the data. For example, action request 312 may request that certain sales data in cache 338 be added or subtracted from one another and the results returned to client device 302. In further embodiments, action executor 340 may utilize workflows to control the ordering of actions available to a user at any particular time. For example, a particular webpage being accessed by user 304 may have certain actions associated with it, such as "View Details," "Analyze Data," or "Change Sales Office."

In various embodiments, action executor 340 may be configured to use account security setting to limit the actions available to a particular user's account. In one embodiment, action executor 340 may be configured to prevent some or all of the users of application context 320 from changing the data stored in database 326. For example, user 304 may be limited to simply accessing the reporting and analytical webpages 332 of application context 320, but may be prevented from changing any of the underlying data in database 326. In another embodiment, action executor may be configured to allow certain users to intermingle data input requests with action requests (e.g., the user has both data creator and data analysis privileges). In such a case, new data sets may be generated and stored in database 326 as a result. For example, user 306 may create a new table or set of tables based on analytical calculations performed on the sales data in database 326 by action executor 340.

Figure 4:
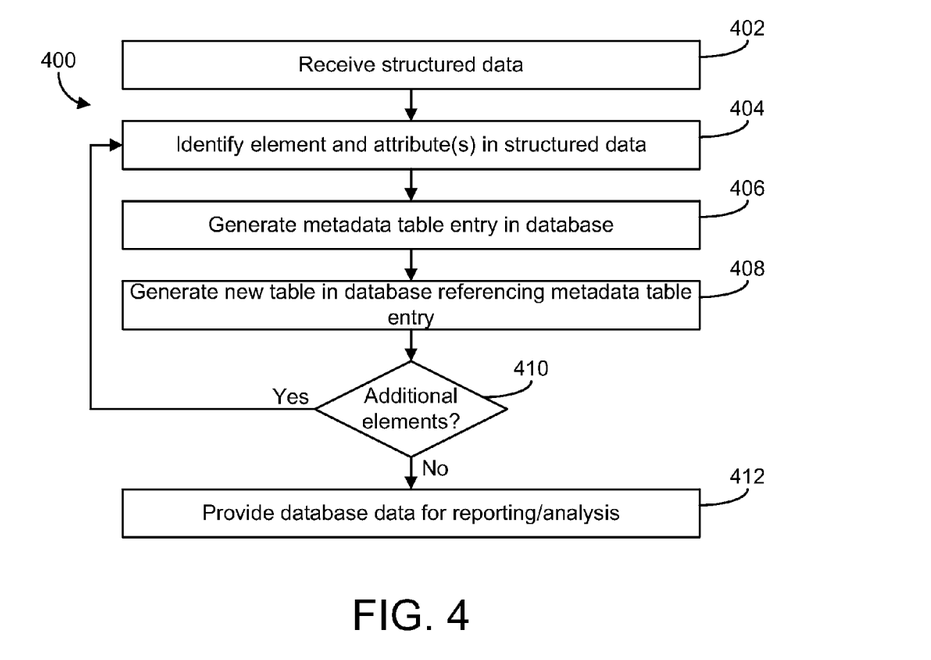
FIG. 4 is a flow diagram of a process for converting structured data into database entries, according to an exemplary embodiment.

Referring now to FIG. 4, a flow diagram of a process 400 for converting structured data into database entries is shown, according to an exemplary embodiment. Process 400 generally allows a user of an online data reporting and analysis service to add, modify, or delete data used by the service from within the service itself. Process 400 may be implemented by one or more computing devices, such as web server 310 shown in FIG. 3, executing machine instructions configured to cause the device to perform process 400. The instructions may correspond to a single application that implements process 400 or an application that performs other functions, as well.

Process 400 includes receiving structured data (step 402). The received structured data may be any form of text-based data that includes metadata to provide a structure for other data in the text-based data. In various embodiments, the received structured data may be in a format configured for use within a webpage. Exemplary formats for the received data include, but are not limited to, XML and JSON. The received data may correspond to a single set of structured data (e.g., a retrieved set of data having a structure, a text file, etc.) or multiple sets of structured data (e.g., multiple text files, multiple sets of interrelated data, etc.). In various embodiments, the structured data may be generated via a web-based interface to a data reporting or analysis service. For example, the structured data may include data for use by the service as part of a report (e.g., a user of the service may request that data inputted by the user be made available for reporting or analysis by the service).

Process 400 includes identifying elements and attributes in the structured data (step 404). In some embodiments, a parser may parse the received structured data to identify the elements and attributes in the structured data. For example, XML formatted data may be parsed using a Simple Application Programming Interface for XML (SAX) parser. Other parsers may also be used, depending on the format of the structured data. In general, elements refer to metadata in the received data that serve to classify the different data values or to form a data structure using the data values. Attributes, in contrast, are directly associated with the data values in the structured data. For example, consider the following structured data in XML format:

```
<Stores>
    <Contacts>
    <Region State = "California">
        <contact City="San Francisco" Store="e-Fashion San Francisco"
        Manager="Daniel"/>
    </Region>
    </Contacts>
</Stores>
```

Here, four elements are used: "stores," "contacts," "Region," and "contact." In some embodiments, an element may have a corresponding symbol that denotes the end of the end of the element, such as "/" in XML. Thus, the above example defines a hierarchical data structure in which the elements are hierarchically related as follows: Stores>Contacts>Region>Contact. The above example also has a number of attributes, such as "State," "City," "Store," and "Manager." According to some embodiments, an attribute may belong to an element. For example, the "State" attribute belongs to the "Region" element and the "Manager" attribute belongs to the "contact" attribute. In various embodiments, an attribute may also have an associated data value. For example, the "State" attribute has the data value of "California" in the above example. Any number of different elements and attributes may be used to define the structured data. For example, another entry in the above example may correspond to contact information for the store located in Colorado Springs, Colo.

Process 400 includes generating a metadata table entry in a database (step 406). In various embodiments, a metadata table may be created in a database according to the data structure of the elements in the received data. In one embodiment, a metadata table may generated at least three columns: a row_id column, an element_name column, and a parent_id column. Each entry in the row_id column may be a unique value and used as the primary key for entries in the table, in one embodiment. In some embodiments, entries in the element_name column and the parent_id column may be populated using the name of an identified element in the structured data and its parent element, if any (e.g., the row_id of the parent element in the database table may be used to populate the parent_id field). If no parent element exists, a null or otherwise unique value may be used for that element's parent_id. For example, the topmost element in a hierarchy may be assigned a parent_id of −1. Using the exemplary XML code discussed previously with respect to step 404, identification of the "Stores" element in the received structured data may be used to generate the following entry in the metadata table in the database:

TABLE 8

| row_id | element_name | parent_id |
|--------|--------------|-----------|
| 1      | stores       | −1        |

Since the "Stores" element is the topmost element in the hierarchy, it has been assigned a row_id of 1 and a parent_id of −1, thereby denoting that it has no parent element. In various embodiments, the metadata table may also be created in response to a first element being identified or may be pre-existing in the database.

Process 400 includes generating a new table in the database referencing the metadata table entry (step 408). In some embodiments, the new table may be named using the row_id of the element in the metadata table or the name of the element. For example, a new table named stores_1 may be generated in response to the {1, stores, −1} entry in the metadata table being created in step 406. In various embodiments, the table may include columns corresponding to a new row_id value (e.g., a unique key for row entries in the new table), the parent_id of the element from the metadata table, and any attributes and data values associated with the identified element. If an element has no attributes, there will be only a single row_id column. For example, the stores_1 table may be defined as follows:

TABLE 9

| row_id | parent_id |
|--------|-----------|
| 1      | −1        | where row_id is a unique value for the row entry in the stores_1 table and parent_id corresponds to the parent_id value in the metadata table (e.g., Table 8). The data type of the table entries may be defaulted to a string or other text-based data type or another data type specified in the structured data, in some embodiments.

Process 400 may include a decision step in which it is determined whether or not there exist any additional elements in the received structured data (step 410). If so, steps 404-408 may be repeated for any remaining elements in the received data. For example, steps 404-408 may be repeated for the "Contacts," "Region," and "Contact" elements in the above example of step 404. As a result of this, each element would have a unique row entry in the metadata table (e.g., Table 8) and its own corresponding table in the database. For example, the "Contacts" element may have a table entry {2, Contacts, 1} in the metadata table and its own table, contacts_2 in the database. Elements having attributes in the structured data may also have their own tables with columns that correspond to the attributes and attribute data values. For example, the region_3 table may have columns {row_id, state, parent_id} and a row entry {1, California, 1} based on the exemplary XML code of step 404. Steps 404-410 may be repeated any number of times until no unprocessed elements remain the received structured data.

Process 400 include providing the database data for purposes of reporting and data analysis (step 412). Once the structured data has been added to a database, it may be used by any number of reporting and data analysis services. For example, data regarding a particular store's sales figures may be included in an online sales report. In some embodiments, the data stored in the database is accessed by the service using queries in a database format, such as SQL. In cases in which the service is a web-based service, it may also be configured to allow a user to send further structured data for entry into the database using process 400. For example, an online reporting and data analysis service may be configured to allow a certain user to also add, modify, or delete data stored in the database through a webpage of the service by using a structured data format, such as XML or JSON.

Figure 5:
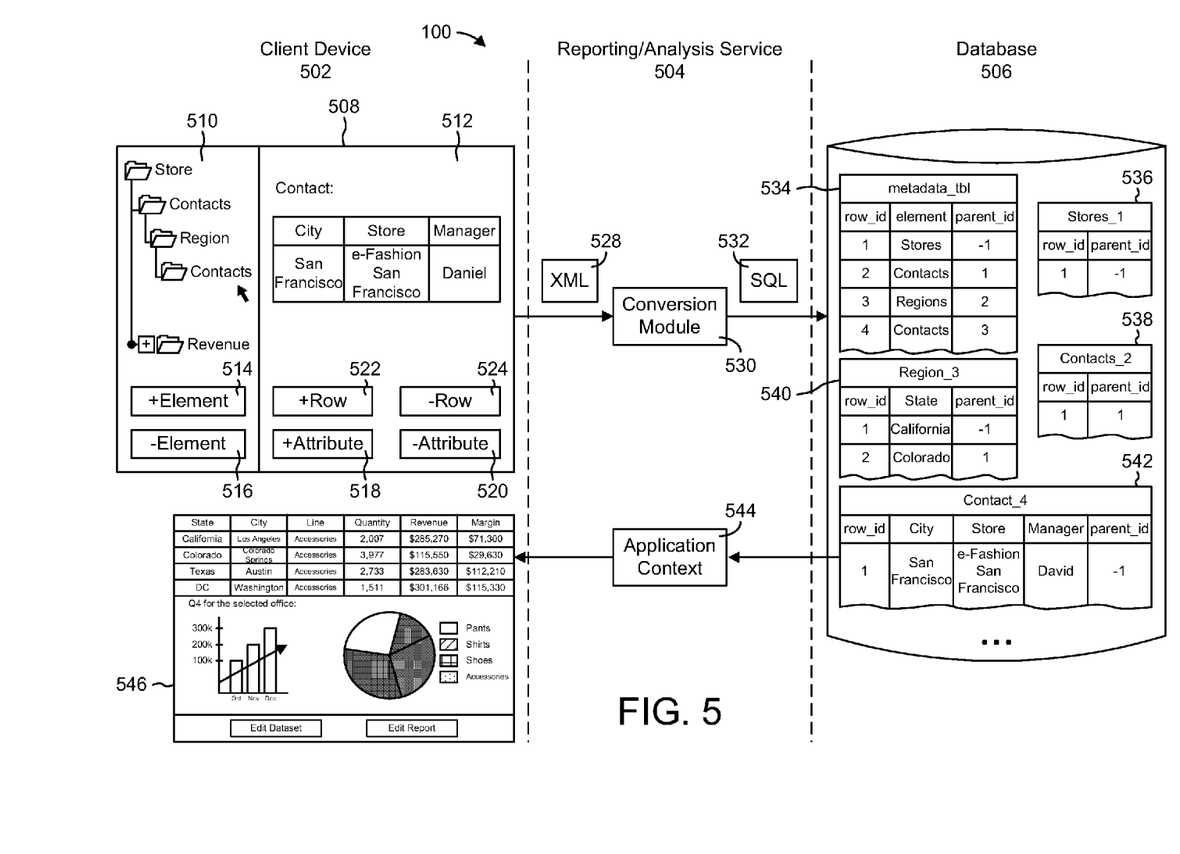
FIG. 5 is an illustration of structured data being converted into database entries and used for online data reporting and analysis, according to an exemplary embodiment.

Referring now to FIG. 5, an illustration 500 is shown of structured data being converted into database entries and used for online data reporting and analysis, according to an exemplary embodiment. As shown, a client device 502 may access a reporting/analysis service 504 via a network, such as a LAN, WAN, or the Internet. Reporting/analysis service 504 is also in communication with a database 506, which may be stored on the same device as reporting/analysis service 504 or on a different device, according to various embodiments. In one embodiment, reporting/analysis service 504 may be accessed by client device via a web browser.

As shown, reporting/analysis service 504 is configured to allow a user of client device 502 to enter data into database 506 via a webpage 508. In some embodiments, reporting/analysis service 504 may first determine whether the user's account allows modification of the data in database 506 before providing webpage 510 to client device 502. For example, some users may be restricted to only viewing reports or analyzing the data in database 506. Webpage 510 may include a first portion 510 that allows the user of client device 502 to define a structure for the data to be added to database 506. Such a structure may be a hierarchy or another data structure, in various embodiments. For example, webpage 510 may include inputs 514, 516 that allow the user to add or remove elements to construct a metadata hierarchy of elements (e.g., Stores>Contacts>Region>Contact, Stores>Revenue, etc.). Webpage 510 may also include a second portion 512 configured to allow the user of client device 502 to add or remove attributes and data values to any defined elements. For example, selection of the "Contact" element in portion 510 may cause table 526 to be displayed in portion 512. Portion 512 may include inputs 518, 520 configured to allow the user to add or remove attributes of the selected element (e.g., columns of table 526), respectively. Portion 512 may also include inputs 522, 524 to add or remove data values for the attributes (e.g., rows entered into table 526). For example, the user may add the attributes "City," "Store," and "Manager," to the Contact element.

Once the data values, attributes, and element structure have been defined in webpage 510, the user may operate client device 502 to send the corresponding structured data to reporting/analysis service 504. For example, XML data 528 containing the structured data may be sent by client device 502 to a conversion module 530 of reporting/analysis service. Conversion module 530 is configured to parse the received XML data 528 and create the corresponding tables and table entries in database For example, conversion module 530 may issue SQL commands 532 to database 506 to reproduce the structure, metadata, and data values in XML data 528. In some embodiments, conversion module 530 creates a metadata table 534 which represents the structure of the elements in XML data 528. For example, conversion module 530 may create separate row entries in metadata table 534 for each element in XML data 528, with each row entry referencing the row id of the element's parent element (e.g., the row entry for the "Contact" element references the row entry for the "Region" element, etc.). In further embodiments, conversion module 530 may also create a new table for each element in XML data 528. For example, conversion module 530 may create tables 536-542 for the "Stores," "Contacts," "Region," and "Contact" elements, respectively. Tables 536-542 may include any attributes of the corresponding elements as columns. For example, table 542 may include columns for the "City," "Store," and "Manager" attributes associated with the "Contact" element. Each of tables 536-542 may also have a parent id column that references a row id of the table of its parent entity. For example, table 542 may include an entry that references the first row of table 540, thereby signifying that the San Francisco store is located in the State of California.

Tables 534-542 entered into database 506 by conversion module 530 may also be available to reporting/analysis service 504 for purposes of presenting the data to users. In one embodiment, a user having designer privileges may define an application context 544 in reporting/analysis service 504. Application context 544 is generally configured to use the data added to database 506 as part of an online report or analysis webpage or portal. For example, the user having designer privileges may define the layout of the webpage or portal, any visual components to be shown on a webpage (e.g., charts, graphs, etc.), and the types of data stored in database 506 to be presented via a webpage. Thus, a user accessing reporting/analysis service 504 may review the data added to database 506 by conversion module 530 via a webpage of application context 544. For example, a user of client device 502 may access a webpage 546 of reporting/analysis service 504 that uses the data added to database 506 by conversion module 530. Webpage 546 may simply report the data or my allow the user to perform analysis on the data (e.g., by requesting additional metrics or computations), in various embodiments. Since the data is added to database 506 directly from within the reporting/analysis service 504, a user of service 504 does not need to use another program to enter the data into database 506 or have specific knowledge of the database commands needed to enter the data into database 506.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method of converting structured data into entries in a database comprising:

providing a webpage having a first input feature configured to add or remove attribute data values and a second input feature configured to add or remove elements to construct a metadata structure for the attribute data values, the webpage being configured to convert the attribute data values and metadata structure into Extensible Markup Language (XML) format for a single structured data file;

receiving the single structured data file;

converting the single structured data file into a plurality of database tables for a database, the conversion of the single structured data file comprising:

generating a metadata database table, each entry of the metadata database table based on an element of the elements of the constructed metadata structure of the single structured data file;

generating, for each entry of the metadata database table, a separate database table, each of the separate database tables being related according to constructed metadata structure for the attribute data values, at least one separate database table references another separate database table;

retrieving one or more attribute data values from the plurality of database tables based on a defined application context for generating a reporting or data analysis webpage;

generating the reporting or data analysis webpage based on the retrieved one or more attribute data values and the defined application context; and providing the reporting or data analysis webpage to report a metric based on the retrieved one or more attribute data values.

2. The method of claim 1, further comprising:

parsing the single structured data file to identify an element of the elements of the constructed metadata structure.

3. The method of claim 2, further comprising:

using a Simple Application Programming Interface for XML (SAX) parser to parse the single structured data file.

4. The method of claim 1, wherein the webpage having the first input feature and the second input feature and the reporting or data analysis webpage are provided by the same online service.

5. The method of claim 1, further comprising:

preventing creating of an entry for an attribute data value in the database tables based on a determination that an account has insufficient permissions to add attribute data values to the database.

6. The method of claim 1, further comprising:

storing the retrieved attribute data values in a cache memory associated with the application context; and using the stored attribute data values to generate the reporting or data analysis webpage.

7. The method of claim 6, further comprising:

refreshing the attribute data values stored in the cache memory responsive to an action request of the application context; and using the refreshed attribute data values to update the reporting or data analysis webpage.

* * * * *